(12) United States Patent
Kurtz

(10) Patent No.: US 8,191,425 B1
(45) Date of Patent: Jun. 5, 2012

(54) GAGE PRESSURE TRANSDUCER AND METHOD FOR MAKING THE SAME

(75) Inventor: Anthony D. Kurtz, Saddle River, NJ (US); Nora Kurtz, legal representative, Saddle River, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 12/971,615

(22) Filed: Dec. 17, 2010

(51) Int. Cl.
*G01L 9/06* (2006.01)
(52) U.S. Cl. ............................ 73/721; 73/727; 73/756
(58) Field of Classification Search ............ 73/700–756
See application file for complete search history.

(56) References Cited

U.S. PATENT DOCUMENTS

| | | | | |
|---|---|---|---|---|
| 6,591,686 B1 * | 7/2003 | Kurtz | ............................ | 73/721 |
| 6,782,754 B1 * | 8/2004 | Broden et al. | ................. | 73/753 |
| 7,432,795 B2 * | 10/2008 | Kurtz et al. | ..................... | 338/36 |
| 7,540,196 B2 * | 6/2009 | Kurtz et al. | ..................... | 73/714 |
| 7,673,518 B2 * | 3/2010 | Kurtz | ............................. | 73/716 |
| 7,921,721 B2 * | 4/2011 | Kurtz | ............................. | 73/714 |
| 2010/0257937 A1 * | 10/2010 | Kurtz | ............................. | 73/721 |
| 2011/0126633 A1 * | 6/2011 | Kurtz | ............................. | 73/723 |

* cited by examiner

*Primary Examiner* — Andre Allen
(74) *Attorney, Agent, or Firm* — Troutman Sanders LLP; James E. Schutz; Jihan A. R. Jenkins

(57) ABSTRACT

A gage pressure transducer comprising a first pressure sensing assembly exposed to a main pressure and a second pressure sensing assembly exposed to a reference pressure. The pressure sensing assemblies comprise half-bridge sensors and means for using an alignment glass plate with each sensor which reduces the amount of oil required for operation, which consequently reduces the back pressures caused by large volumes of oil. The pressure sensor assemblies are hermetically sealed using glass frits, therefore enabling the gage pressure transducer to robustly and accurately measure pressure in harsh environments.

21 Claims, 5 Drawing Sheets

GAGE PRESSURE TRANSDUCER AND METHOD FOR MAKING THE SAME

TECHNICAL FIELD

The present invention relates to gage pressure transducers, and more particularly to a gage pressure transducer comprising a plurality of pressure sensing assemblies in a single housing.

BACKGROUND

Gage pressure transducers are often used to measure gage/differential pressures in harsh environments. Generally, gage pressure transducers comprise two pressure sensing assemblies, with one pressure sensing assembly being exposed to a main pressure and the other being exposed to a reference pressure. Each pressure sensing assembly includes a half-bridge sensor such that when they combine together, they provide a gage pressure measurement of the environment to be measured.

Many of the gage pressure transducer assemblies of the prior art, however, present shortcomings that interfere with the accuracy of the gage pressure measurement. For example, some embodiments utilize non-oil filled pressure capsules contained in a non-hermetic gage transducer assembly. The non-hermeticity of this gage transducer assembly enables the harsh environment to interfere with the operation of the transducer assembly, which consequently may adversely affect the accuracy of overall gage pressure measurement. In another example, other embodiments utilize wire-bonded oil filled pressure capsules, which require large volumes of oil to operate. Large volumes of oil, however, cause significant back pressure against the deflecting diaphragm, which also interferes with the accuracy of the overall gage pressure measurement.

Accordingly, there is a need for a gage pressure transducer assembly that utilizes hermetically sealed pressures sensing assemblies such that harsh environments do not interfere with the operation and, further, an assembly that utilizes minimal oil, such that back pressures associated with large oil volumes can be reduced.

BRIEF SUMMARY OF THE INVENTION

Embodiments of the present invention provide a miniaturized, hermetically sealed gage transducer assembly, and a method for making the same, comprising: a housing having a first section and a second section, a first sensing assembly housed in the first section, the first sensing assembly being exposed to a main pressure, and a second sensing assembly housed in the second section, the second sensing assembly being exposed to a reference pressure, and an oil region that is less than approximately 0.015 inches. The first sensing assembly and the second sensing assembly may be leadless. Further, the first and second sensing assemblies may be substantially identical in configuration and in electrical communication with each other.

More specifically, the first and second sensing assemblies may each comprise a half-bridge piezoresistive sensing network that electrically communicate with each other to form a complete Wheatstone Bridge.

Even more specifically, the sensing assemblies may comprise: a header shell; a glass pre-form configured to fit within the header shell, the glass pre-form comprising a plurality of pin apertures and an oil tube aperture; a plurality of header pins, each extending through one of the plurality of pin apertures past a top surface of the glass pre-form; an oil tube extending through the oil tube aperture past the top surface of the glass pre-form; a sensor mounted onto a top surface of the glass pre-form, wherein the sensor comprises electrical contact pads that are aligned and in electrical communication with the header pins; a diaphragm mounted on a top surface of the header shell such that it is above the sensor; wherein the oil region Is disposed between the diaphragm and the sensor, wherein the oil tube provides oil to the oil region. The sensing assemblies may further comprise an alignment glass plate mounted onto the top surface of the glass pre-form, comprising a first aperture for encircling the oil tube and a second aperture for encircling the sensor.

To hermetically seal the device, glass frits may be used to secure the bonding between the header pins and the electrical contact pads, the sensor and the glass pre-form, and the alignment glass plate and the glass pre-form.

Further, the header shell can comprise an outwardly extending flange adapted to secure and hermetically seal the first and second sensing assemblies into the first and second sections, respectively.

The resultant device is a miniaturized, hermetically sealed gage pressure transducer comprising sensing assemblies that, in combination, accurately measure gage pressure in harsh environments without interference from back pressures caused by large oil volumes.

DETAILED DESCRIPTION

Figure 1:
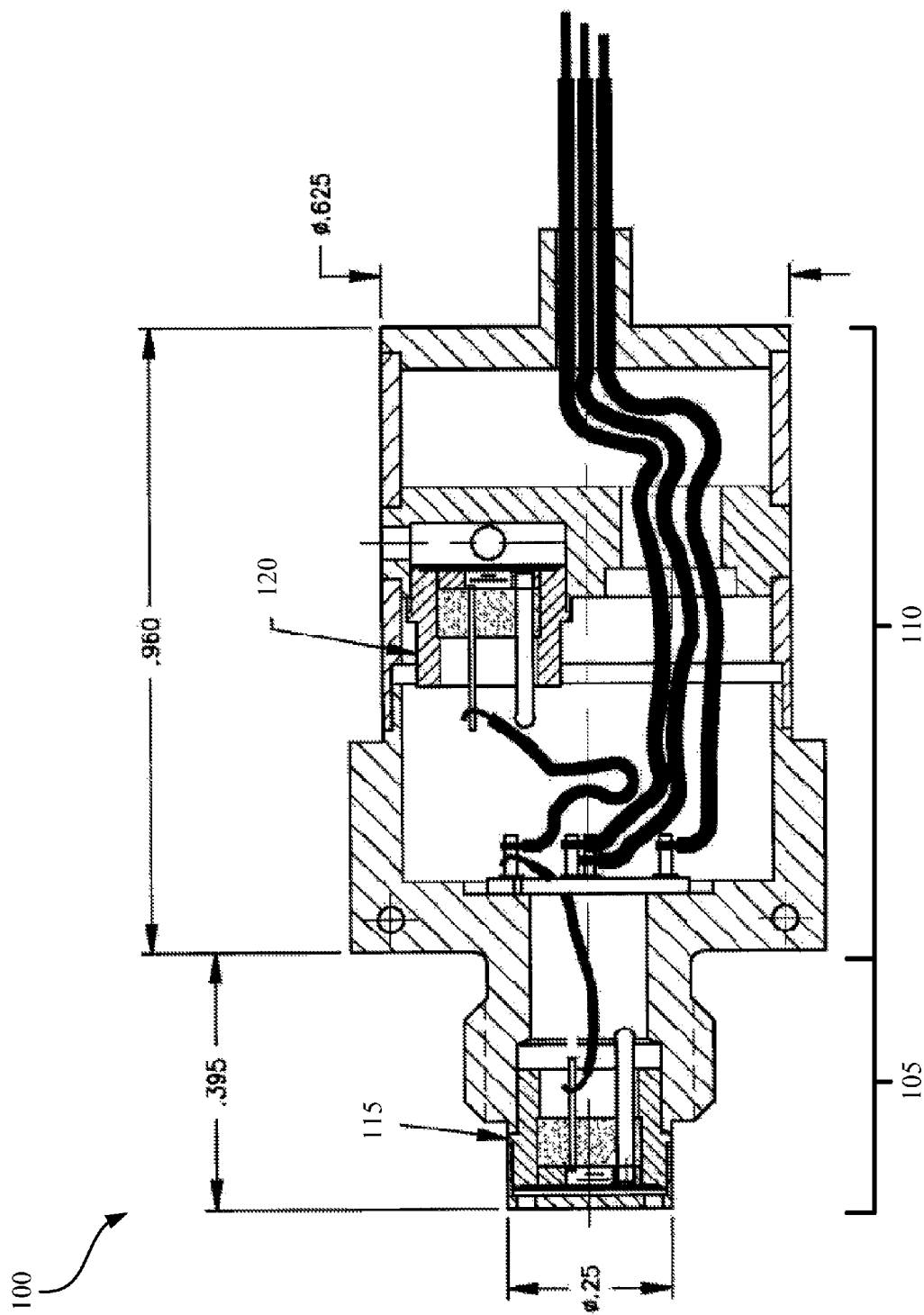
FIG. 1 illustrates a gage pressure transducer assembly comprising two pressure sensing assemblies according to an aspect of the present invention.

Referring now to the drawings, in which like numerals represent like elements, exemplary embodiments of the present invention are herein described. It is to be understood that the figures and descriptions of the present invention have been simplified to illustrate elements that are relevant for a clear understanding of the present invention, while eliminating, for purposes of clarity, many other elements found in typical gage pressure transducers and methods of making and using the same. Those of ordinary skill in the art will recognize that other elements are desirable and/or required in order to implement the present invention. However, because such elements are well known in the art, and because they do not facilitate a better understanding of the present invention, a discussion of such elements is not provided herein.

Referring to FIG. 1, there is shown a gage pressure transducer assembly 100 having a first section 105 and a second section 110. A first pressure sensing assembly 115 is housed in the first section 105 and a second pressure sensing assembly 120 is housed in the second section 110. The first pressure sensing assembly 115 and the second pressure sensing assembly 120 may be fit within their respective pressure ports, which are defined within the gage pressure transducer assembly 100. The first 115 and second 120 pressure sensing assemblies are welded within the pressure ports such that they are hermetically sealed within the pressure ports. The hermetic sealing enables the gage pressure transducer assembly 100 to accurately measure pressures in harsh environment applications without interference from the environment.

In various embodiments of the present invention, the gage pressure transducer assembly 100 is miniaturized. This miniaturization is achieved by utilizing pressure sensing assemblies 115/120, which may be leadless and are described further herein. In one example, the length of the first section 105 is approximately 0.395 inches and the width is approximately 0.25 inches. In another example, the length of the second section 110 is approximately 0.960 inches and the width is approximately 0.625 inches. The embodiments of the present invention, however, are not limited to these dimensions and can be of many dimensions.

Figure 2:
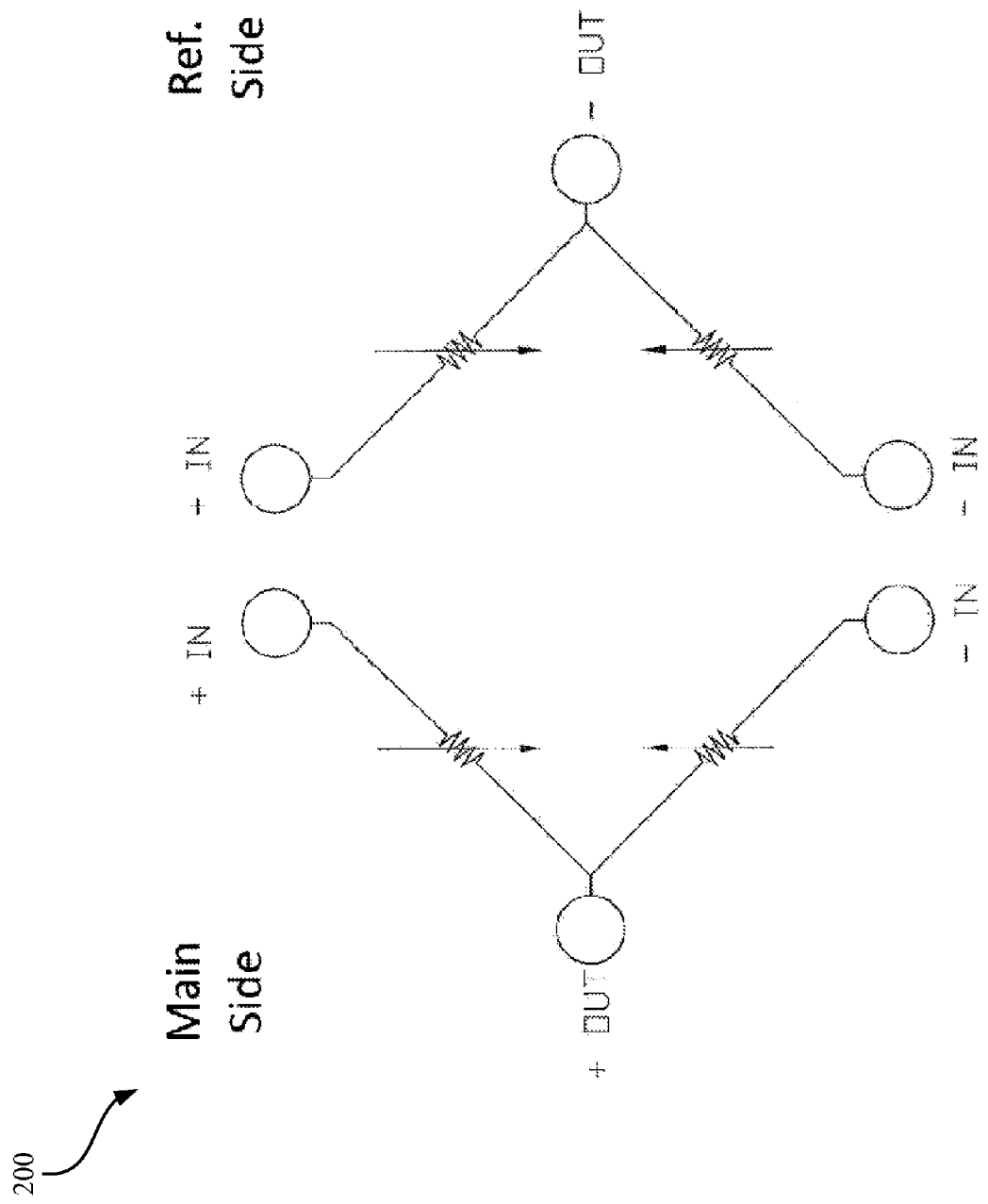
FIG. 2 illustrates a combined Wheatstone Bridge according to an aspect of the present invention.

The first pressure sensing assembly 115 of the present invention may be exposed to a main (external) pressure, while the second pressure sensing assembly 120 may be exposed to a reference (absolute) pressure. Both the first pressure sensing assembly 115 and the second pressure sensing assembly 120 comprise a half-bridge piezoresistive sensing network and electrically communicate with each other to form a complete Wheatstone bridge, as illustrated in FIG. 2. The Wheatstone Bridge subtracts the reference pressure from the main pressure, which therefore provides an accurate gage pressure measurement.

Figure 3:
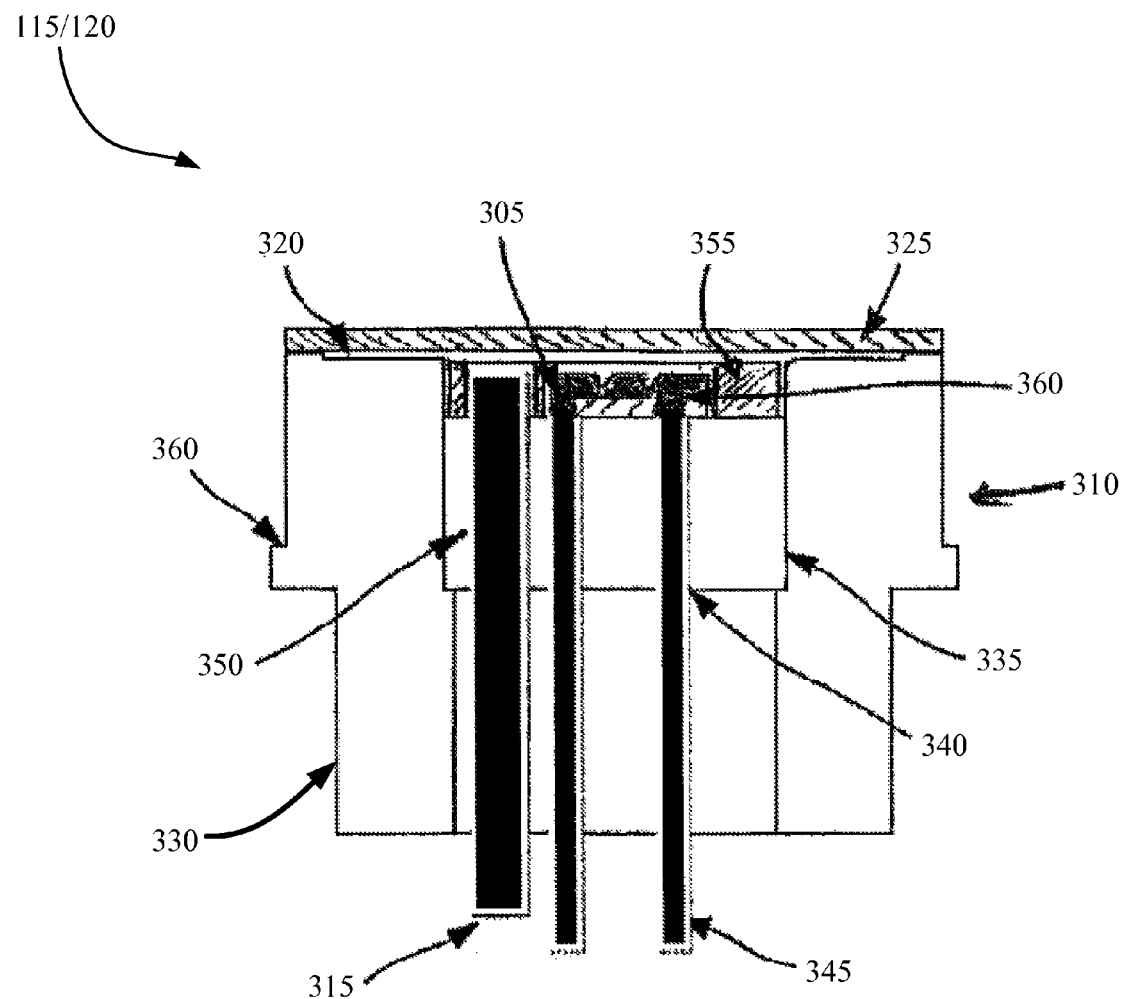
FIG. 3 provides a cross-sectional illustration of a leadless pressure sensing assembly according to an aspect of the present invention.

Referring to FIG. 3, there is shown an embodiment of the first 115 and second 120 pressure sensing assemblies, which are substantially identical in configuration. The first 115 and second 120 pressure sensing assemblies generally comprise a leadless sensor 305, a leadless header assembly 310, and a metal diaphragm 325. More specifically, the metal diaphragm 325 is secured to the header assembly 310 and covers the top portion of the leadless sensor 305, which is also secured to the header assembly. Further, the first 115 and second 120 pressure sensing assemblies comprise an oil region 320 disposed between the metal diaphragm 325 and the sensor 305. This general configuration of the first 115 and second 120 pressure sensing assemblies utilizes less oil in comparison to designs in the prior art. Less oil utilization reduces back pressures caused by large amounts of oil, and therefore optimizes the overall transducer performance and enables its size to be miniaturized.

The header assembly 310 comprises a header shell 330, a glass pre-form 335, header pins 345, and an oil tube 315. The exterior of the header shell 330 has an outwardly extending flange 360, which enables the welding of the header assembly 310 into the respective pressure ports defined within the gage pressure transducer assembly 100. This configuration further facilitates complete hermetic sealing of the gage pressure transducer assembly 100, which enables superior pressure transmission to the sensors 305 of the first 115 and second 120 pressure sensing assemblies.

The glass pre-form 335 is configured to fit within the header shell 330. In various embodiments, the glass pre-form 335 comprises a plurality of pin apertures 340 and an oil tube aperture 350. The pin apertures 340 are configured to receive header pins 345 are adapted to electrically communicate with the sensor 305. In some embodiments, the header pins 345 may have a diameter of approximately 0.01 inches and may extend approximately 0.005 inches from the top surface of the glass pre-form 335 to make contact with contact terminals located on the sensor 305. The header pins 345 are not limited to these dimensions, however.

The oil tube aperture 350 is configured to receive the oil tube 315, which provides oil to the oil region 320 located between the metal diaphragm 325 and the sensor 305. In some embodiments, the oil tube 315 is approximately 0.03 inches in diameter, however other embodiments may comprise oil tubes of different dimensions.

Figure 4:
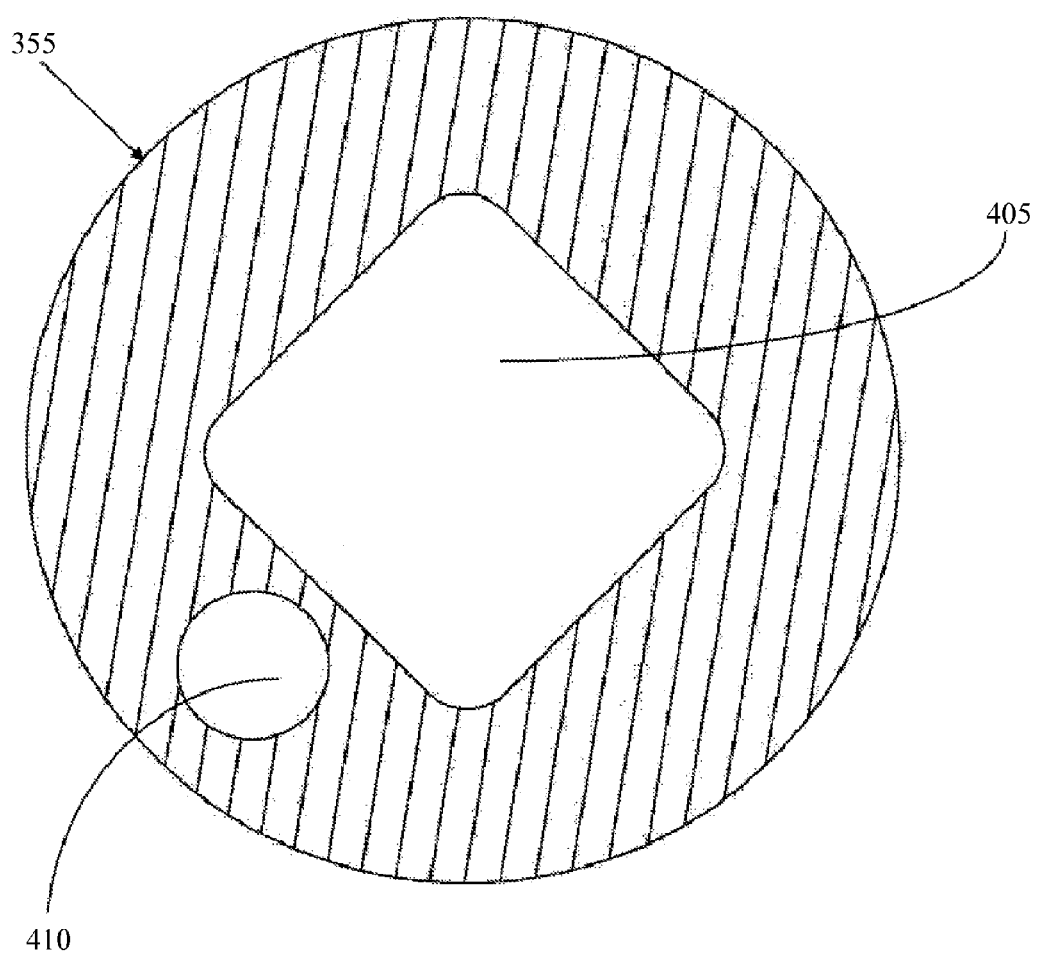
FIG. 4 provides a top view illustration of an alignment glass plate according to an aspect of the present invention.

Referring to FIG. 4, there is shown an alignment glass plate 355. This alignment glass plate 355 helps to align the sensor 305 of the first 115 and second 120 pressure sensing assemblies. The alignment glass plate 355 defines a centralized first aperture 405 and a second aperture 410. The first aperture 405 is substantially square-shaped in cross section and configured to accommodate the sensor 305, such that it covers the sides of the sensor 305. It should be understood that because the first aperture 405 cooperatingly accommodates the sensor 305, it therefore takes on the approximate shape and dimensions of the sensor 305. The second aperture 410 is configured to encircle the oil tube 315. Accordingly, the second aperture 410 is substantially circular-shaped in cross section and takes on the approximate shape and dimensions of the oil tube 315.

Figure 5:
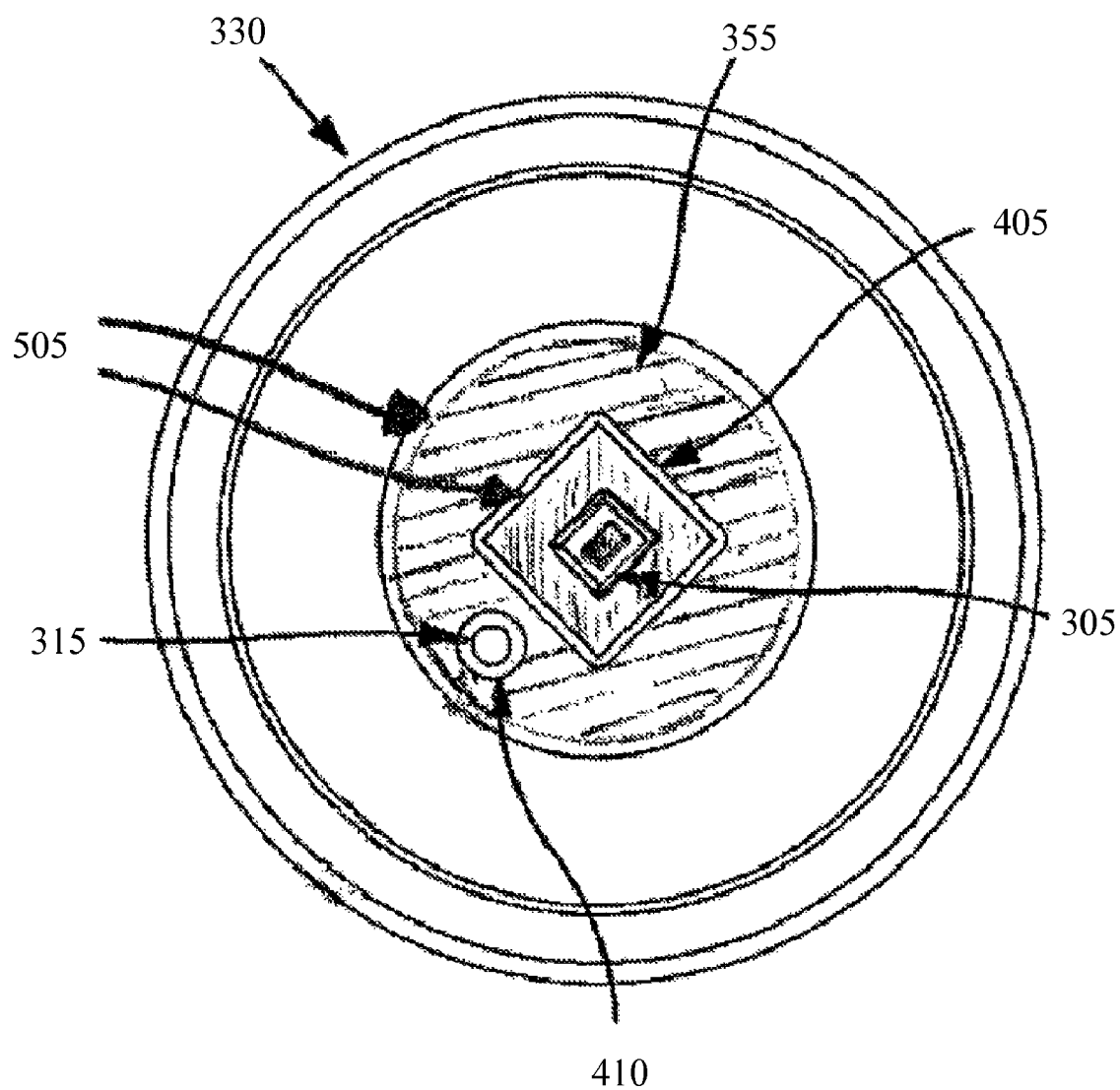
FIG. 5 provides a cross-sectional illustration of the pressure sensing assembly according to an aspect of the present invention.

As illustrated in FIG. 3, the alignment glass plate 355 may have a diameter substantially equal to the diameter of the glass pre-form 335, such that the alignment glass plate 355 may be aligned and mounted to the glass pre-form 335. To secure the attachment of the alignment glass plate 355 to the glass pre-form 335, a non-conductive glass frit may be used to enhance the bonding, which fills into small spaces between the alignment glass plate 355 and the glass pre-form 335. FIG. 5 illustrates the alignment glass plate 355 mounted onto the glass pre-form 335, wherein glass frit 505 is used to enhance the bonding.

The bottom of the sensor 305 may also be mounted onto the glass pre-form 335. A non-conductive glass frit may be used to enhance the bonding between the bottom of the sensor 305 and the glass pre-form 335. A conductive glass frit may be used to bond the header pins 345 to the contact terminals on the sensor 305, such to enable electrical communication between the header pins 345 and the sensor 305. The non-conductive glass frit enhances bonding by filling in voids between the sensor 305 and the glass pre-form 335, and the conductive glass frit enhanced bonding between the header pins 345 and the contact terminals on the sensor 305.

Referring back to FIG. 3, the metal diaphragm 325 may be mounted onto the header shell 330 such that it is positioned above the sensor 305 and the alignment glass plate 355. Disposed between the metal diaphragm 325 and the sensor 305 and the alignment glass plate 355 is an oil region 320, wherein oil from the oil tube 315 may be deposited.

Many of the embodiments of the prior art do not comprise gold bonds or gold wires, therefore enabling the size of the oil region 320 to be drastically reduced in comparison to oil regions of the prior art. The oil region 320 of the present invention, for example, may be less than approximately 0.015 inches, and more specifically may be between 0.001 to 0.002 inches in thickness. Such reduced dimensions reduce the amount of oil required for the first and second pressure sensing assemblies 115/120 by at least an order of magnitude in comparison to the non-leadless oil filled sensors of the prior art.

The reduced oil volume correspondingly reduces the back pressure associated with the oil, which may be calculated using the equation below:

$$P = \frac{16VEt^3}{\pi(1-v^2)a^6}$$

where V is the expanded volume of the oil, t is the thickness of the diaphragm, E is Young's modulus of the diaphragm, v is Poisson's ratio, and a is the radius of the diaphragm. The reduced back pressure enables the gage pressure transducer 100 to accurately measure gage pressures at very low pressures, for example, below 5 psi.

The resultant device is a miniaturized, hermetically sealed gage pressure transducer comprising pressure sensing assemblies that, in combination, accurately measure gage pressure in harsh environments without interference from back pressures caused by large oil volumes.

I claim:

1. A miniaturized, hermetically sealed gage transducer assembly, comprising:
   a housing having a first section and a second section;
   a first sensing assembly housed in the first section, the first sensing assembly being exposed to a main pressure;
   a second sensing assembly housed in the second section, the second sensing assembly being exposed to a reference pressure;
   wherein the first sensing assembly and the second sensing assembly are substantially identical in configuration and are in electrical communication with each other; and
   an oil region that is less than approximately 0.015 inches.

2. The gage transducer assembly of claim 1, wherein the first and second sensing assemblies each comprise a half-bridge piezoresistive sensing network and electrically communicate with each other to form a complete Wheatstone Bridge.

3. The gage transducer assembly of claim 1, wherein the first and second sensing assemblies comprise:
   a header shell;
   a glass pre-form configured to fit within the header shell, the glass pre-form comprising a plurality of pin apertures and an oil tube aperture;
   a plurality of header pins, each extending through one of the plurality of pin apertures past a top surface of the glass pre-form;
   an oil tube extending through the oil tube aperture past the top surface of the glass pre-form;
   a sensor mounted onto a top surface of the glass pre-form, wherein the sensor comprises electrical contact pads that are aligned and in electrical communication with the header pins; and
   a diaphragm mounted on a top surface of the header shell such that it is above the sensor;
   wherein the oil region is disposed between the diaphragm and the sensor, and wherein the oil tube provides oil to the oil region.

4. The gage transducer assembly of claim 3, wherein the first and second sensing assemblies further comprise:
   an alignment glass plate mounted onto the top surface of the glass pre-form, comprising a first aperture for encircling the oil tube and a second aperture for encircling the sensor.

5. The gage transducer assembly of claim 4, wherein the alignment glass plate is secured to the glass pre-form using a non-conductive glass frit.

6. The gage transducer assembly of claim 3, wherein the header shell comprises an outwardly extending flange adapted to secure and hermetically seal the first and second assemblies into the first and second sections, respectively.

7. The gage transducer assembly of claim 3, wherein the sensor is secured to the glass pre-form using a non-conductive glass frit.

8. The gage transducer assembly of claim 3, wherein the plurality of header pins are secured to the electrical contact pads of the sensor using a conductive glass frit.

9. The gage transducer assembly of claim 3, wherein the length of the first section is approximately 0.395 inches and the width is approximately 0.25 inches.

10. The gage transducer assembly of claim 3, wherein the length of the second section is approximately 0.960 inches and the width is approximately 0.625 inches.

11. The gage transducer assembly of claim 3, wherein the header pins are approximately 0.010 inches in diameter.

12. The gage transducer assembly of claim 3, wherein the oil tube is approximately 0.03 inches in diameter.

13. The gage transducer assembly of claim 3, wherein the oil region is approximately between 0.001 and 0.002 inches in thickness.

14. The gage transducer assembly of claim 1, wherein the first and second sensing assemblies are leadless.

15. A miniaturized, hermetically sealed gage transducer assembly, comprising:
   a housing having a first section and a second section;
   a first leadless sensor assembly exposed to a main pressure and housed in the first section;
   a second leadless sensor assembly exposed to a reference pressure and housed in the second section; and
   the first and second leadless sensor assemblies being substantially identical in configuration and comprising:
   a header shell;
   a glass pre-form configured to fit within the header shell, the glass pre-form comprising a plurality of pin apertures and an oil tube aperture,
   a plurality of header pins, each extending through the plurality of pin apertures and past a top surface of the glass pre-form,
   an oil tube extending through the oil tube aperture past the top surface of the glass pre-form,
   a sensor mounted onto a top surface of the glass pre-form, wherein the sensor comprises electrical contact pads that are aligned with and in electrical communication with the header pins;
   a diaphragm mounted on a top surface of the header shell such that it is above the sensor; and
   an oil region disposed between the diaphragm and the sensor, wherein the oil tube provides oil to the oil region.

16. The gage transducer assembly of claim 15, wherein the first and second leadless sensor assemblies further comprise:
   an alignment glass plate mounted onto the top surface of the glass pre-form, comprising a first aperture for encircling the oil tube and a second aperture for encircling the sensor.

17. A method of making a miniaturized, hermetically sealed gage transducer assembly, comprising:
   making a first and second leadless sensor assembly, comprising
   providing a header shell,
   fitting a glass pre-form within the header shell, the glass pre-form comprising a plurality of pin apertures and an oil tube aperture,
   inserting a plurality of header pins into the plurality of pin apertures such that they extend through the pin apertures past a top surface of the glass pre-form, inserting an oil tube into the oil tube aperture such that it extends through the oil tube aperture past the top surface of the glass pre-form, mounting a sensor comprising electrical contact pads onto a top surface of the glass pre-form, such that the electrical contact pads are aligned and in electrical communication with the plurality of header pins, mounting a diaphragm on a top surface of the header shell such that it is positioned above the sensor, providing oil to an oil region disposed between the diaphragm and the sensor, and welding the first and second leadless sensor assemblies into a first and second section of the gage transducer assembly, respectively.

18. The method of claim 17, further comprising:
providing an alignment glass plate comprising a first aperture for encircling the oil tube and second aperture for encircling the sensor, and
mounting the alignment glass onto the top surface of the glass pre-form.

19. The method of claim 18, further comprising securing the alignment glass plate to the glass pre-form using a non-conductive glass frit.

20. The method of claim 17, further comprising securing the sensor to the glass pre-form using a non-conductive glass frit.

21. The method of claim 17, further comprising securing the plurality of header pins to the electrical contact pads on the sensor using a conductive glass frit.

* * * * *